(12) United States Patent
Ross

(10) Patent No.: US 6,807,787 B1
(45) Date of Patent: Oct. 26, 2004

(54) SYSTEM FOR JOINING FOAM COMPONENTS

(76) Inventor: Stephen Ross, 4750 E. Wesley Dr., Anaheim, CA (US) 92807

( * ) Notice: Subject to any disclaimer, the term of this patent is extended or adjusted under 35 U.S.C. 154(b) by 0 days.

(21) Appl. No.: 10/358,922

(22) Filed: Feb. 5, 2003

(51) Int. Cl.$^7$ ................................................ E04B 2/00
(52) U.S. Cl. ................................................ 52/586.1
(58) Field of Search ........................... 52/586.1, 586.2, 52/309.7

(56) References Cited

U.S. PATENT DOCUMENTS

| | | | |
|---|---|---|---|
| 2,101,378 A | 12/1937 | Wiskoff ........................ 217/7 |
| 2,108,373 A | 2/1938 | Greulich ...................... 189/37 |
| 3,043,408 A | 7/1962 | Attwood ...................... 189/34 |
| 3,276,797 A | * 10/1966 | Humes, Jr. .................. 52/715 |
| 3,483,665 A | 12/1969 | Miller ......................... 52/461 |
| 3,512,819 A | * 5/1970 | Gillingwater et al. ........ 52/461 |
| 3,517,474 A | 6/1970 | Lanternier .................. 52/732 |
| 3,563,582 A | * 2/1971 | Shroyer et al. .......... 52/309.13 |
| 3,606,718 A | 9/1971 | Curran ....................... 52/542 |
| 3,706,169 A | 12/1972 | Rensch ....................... 52/263 |
| 4,407,104 A | 10/1983 | Francis ....................... 52/309 |
| 4,566,241 A | 1/1986 | Schneller .................... 52/481 |
| 4,586,301 A | 5/1986 | Hickman ..................... 52/96 |
| 4,737,060 A | 4/1988 | Birckhead ................. 411/468 |
| 4,875,322 A | 10/1989 | Rozzi ......................... 52/746 |
| 5,009,051 A | 4/1991 | Trezza ........................ 52/410 |
| 5,022,205 A | 6/1991 | Ford ........................ 52/309.16 |
| 5,072,569 A | 12/1991 | VanTassel .................... 52/745 |
| 5,178,927 A | 1/1993 | Turner ......................... 428/71 |
| 5,247,773 A | * 9/1993 | Weir ......................... 52/592.3 |
| 5,287,671 A | 2/1994 | Ueki ........................... 52/588 |
| 5,502,939 A | * 4/1996 | Zadok et al. ............... 52/309.9 |
| 5,511,346 A | 4/1996 | Kenworthy ............... 52/169.5 |
| 5,619,827 A | 4/1997 | Church ......................... 52/60 |
| 5,661,929 A | 9/1997 | Ross |
| 5,694,730 A | * 12/1997 | Del Rincon et al. ....... 52/586.1 |
| 5,723,225 A | 3/1998 | Yasui et al. ................. 428/593 |
| 5,765,318 A | 6/1998 | Michelsen ..................... 52/98 |
| 5,893,248 A | 4/1999 | Beliveau .................... 52/309.7 |
| 6,014,849 A | * 1/2000 | Yonemura ................. 52/586.1 |
| 6,067,765 A | 5/2000 | Jones ....................... 52/309.12 |
| 6,085,479 A | 7/2000 | Carver ....................... 52/309.8 |
| 6,101,778 A | * 8/2000 | M.ang.rtensson .......... 52/582.1 |
| 6,158,190 A | 12/2000 | Seng ......................... 52/731.5 |
| 6,203,232 B1 | 3/2001 | Ward .......................... 403/14 |
| 6,272,796 B1 | 8/2001 | Metzler ...................... 52/93.1 |
| 6,315,026 B1 | 11/2001 | Ross |
| 6,387,469 B1 | 5/2002 | Ristow et al. .............. 428/116 |

* cited by examiner

Primary Examiner—Peter M. Cuomo
Assistant Examiner—Stephen Vu
(74) Attorney, Agent, or Firm—Goldstein Law Offices, P.C.

(57) ABSTRACT

A system for joining blocks of foam, each block having a surface, using a connector system. The connector system including a first and second connector which each have a lateral flange for securing within one of the blocks of foam, beneath and parallel to the surface. The connector system has a mechanism for joining the first connector to the second connector to secure the blocks of foam together while holding the surfaces of the blocks closely against each other.

14 Claims, 6 Drawing Sheets

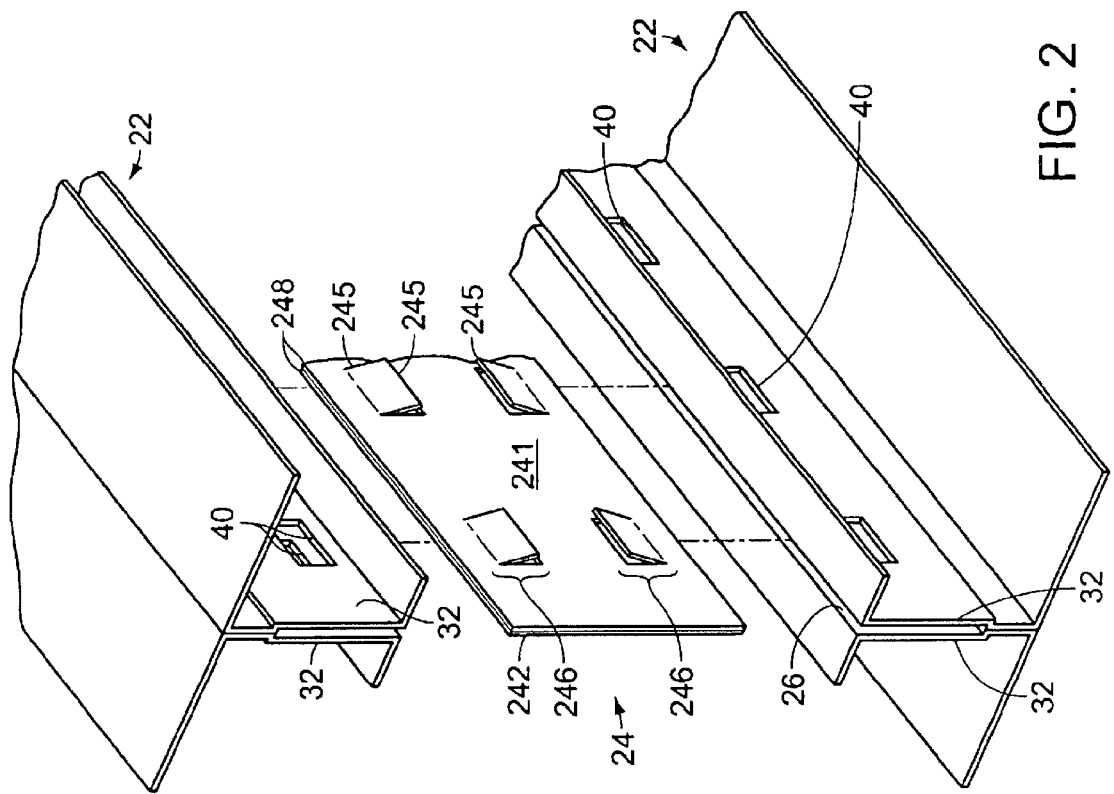
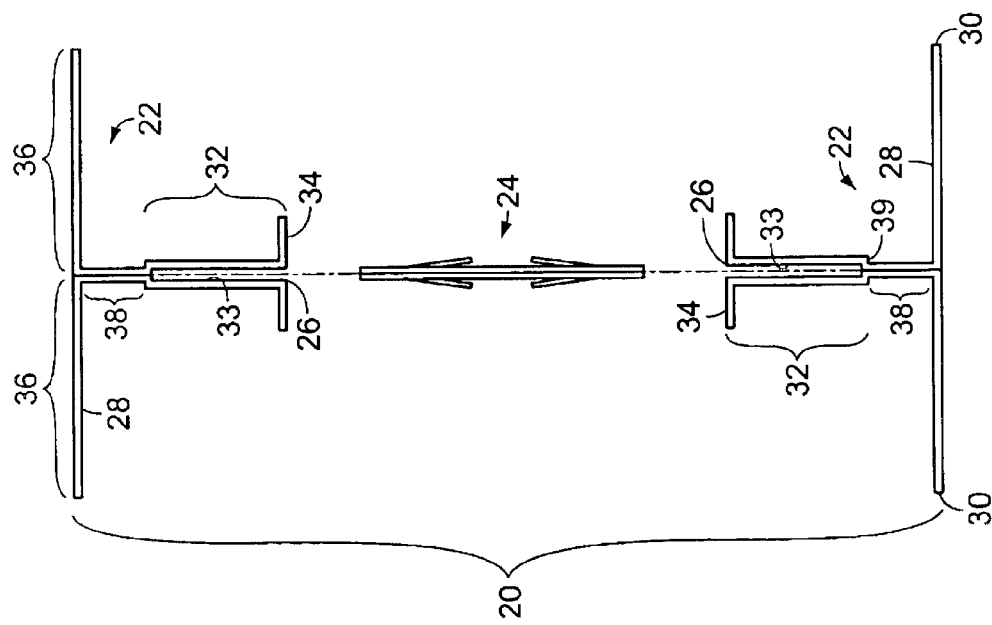

SYSTEM FOR JOINING FOAM COMPONENTS

BACKGROUND OF THE INVENTION

The invention relates to a system for joining foam components. More particularly, the invention relates to a system which allows a surface of a foam 'block' to be joined to a surface of another foam 'block'.

Although foam, especially polystyrene and polyurethane, holds great promise as a building material, its limitation lies in the difficulty of interfacing with other building materials. For example, common fasteners such as screws and nails cannot be used to attach other building materials to foam. They 'pull out' from the foam just as easily as they penetrate the foam.

The most common way in which foam is attached to other surfaces is with adhesives. The adhesives, however, only adhere to the outer surface of the foam. Accordingly, the strength of the joint relies upon the internal structural integrity of the foam. Such a joint may present reasonable resistance to shearing forces, but cannot resist much torsional loading against the joint. Such forces will have a tendency to 'peel away' the foam at the joint. In addition, even in a suitable installation, adhesives have a tendency to weaken with age.

My prior U.S. Pat. No. 5,661,929 discloses a system which allows a building material to be anchored to foam by inserting a metal channel into the foam, and then anchoring the building material to the metal channel using ordinary fastening devices, such as screws or nails. This system allows a variety of other building materials to be fastened to the foam using screws or nails, by fastening to the metal channel therein.

While these units may be suitable for the particular purpose employed, or for general use, they would not be as suitable for the purposes of the present invention as disclosed hereafter.

SUMMARY OF THE INVENTION

It is an object of the invention to produce an attachment system which allows two or more foam shapes to be rigidly attached to each other, so as to enhance the useability of foam as a building material for innumerable products and structures. Accordingly, the system employs mateable connection devices, which are partially submerged within the foam shapes and are subsequently mated to attach the foam shapes.

It is another object of the invention to provide an attachment system that has superior strength for ensuring a sound connection between foam shapes. Accordingly, each connection device has a transversely extending flange, which significantly anchors the connection device within the foam and resists pulling out of the surface.

It is yet another object of the invention to provide an attachment system which allows foam shapes to be fabricated so as to allow them to be optionally attached at a later time. Accordingly, by one embodiment of the invention, two female connection devices are employed, each is submerged beneath a surface of one of the foam shapes with its open end oriented toward the surface and located substantially at the surface. A lance is inserted into and secures within both openings to secure the female connection devices together, and thus secures the foam shapes with their surfaces abutting each other. The open ends can even be concealed immediately below the surface of the foam shapes, so that they are only subsequently exposed if needed to attach to another foam shape.

It is a further object of the invention to provide superior tensile strength at the joint between the foam shapes which resists detachment of the connection devices. Accordingly, by at least one embodiment, one of the connection devices has a male component which secures directly in the open end of a female connection device, providing a direct attachment between the connection devices.

It is a still further object of the invention to provide superior anchoring within the foam. Accordingly, by one embodiment of the invention, the transverse portion of the connection device has a complex shape, such as a 'dutch hat' shape, which increases the surface area of the foam against which the connection device is anchored and distributes tensile forces in several directions.

It is yet a further object of the invention to provide a system which has superior strength, yet is inexpensively manufactured. Accordingly, the components of the connection system can each be formed from one or two pieces material-meeting the dual goals of structural integrity and inexpensive fabrication.

The invention is a system for joining blocks of foam, each block having a surface, using a connector system. The connector system including a first and second connector which each have a lateral flange for securing within one of the blocks of foam, beneath and parallel to the surface. The connector system has a mechanism for joining the first connector to the second connector to secure the blocks of foam together while holding the surfaces of the blocks closely against each other.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is an exploded side elevational view, illustrating components of a connector set according to a first embodiment of the invention, employing a pair of female connection devices and a lance.

FIG. 2 is a diagrammatic perspective view, with parts broken away, illustrating components of the first embodiment of the invention.

DETAILED DESCRIPTION OF THE PREFERRED EMBODIMENTS

Figure 3:
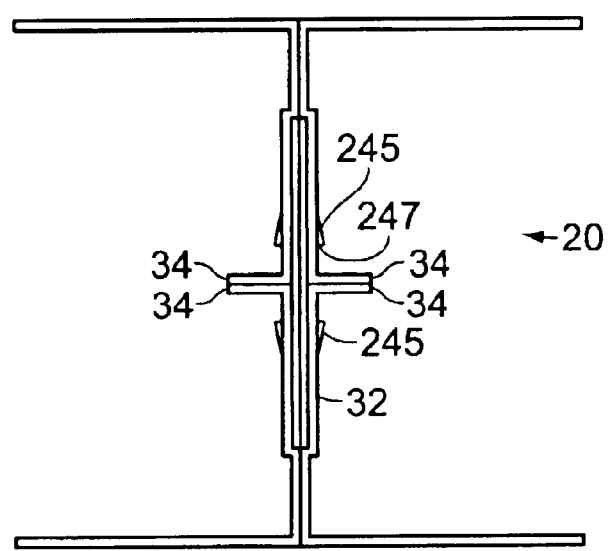
FIG. 3 is a side elevational view, wherein the female connection devices have been joined with the lance.

In general, the invention relates a system for connecting foam shapes using a connector set. In general, the connector set includes a first connector, a second connector, and a mechanism for securing the first connector and second connector. The first connector and second connector are each anchored within one of the foam shapes: close to and parallel to its surface. The first and second connectors have at least one laterally extending flange which anchors that connector within the foam, and prevents it from 'pulling out' when a force normal to the surface is exerted. Following this concept, several embodiments of the connector set and its use are illustrated herein.

FIG. 1 illustrates an embodiment of a connector set 20. The connector set 20 includes a pair of female connection devices 22 and a lance 24. The female connection devices 22 have an open end 26 and a flange 28 fully opposite from the open end 26. Each female connection device 22 is preferably made from a pair of symmetrical plates 30 of sheet metal, which are bent and attached together by spot welding or the like.

In particular, each plate 30 has an open part 32, where the plates extend substantially parallel and are spaced slightly apart; a surface bend 34 at the open end 26 where each of the plates extend substantially perpendicular to its associated open part 32 and the two plates extend fully away from each other; a flange half 36 where the plates are bent to extend parallel to yet away from each other; and an attachment part 38 which extends substantially parallel to the open part 32, between the open part 32 and flange half 36. The attachment parts 38 of the two plates 30 extend parallel, against each other, and are fastened together. Transitional parts 39 are inward bends which transition the plates 30 between being spaced slightly apart at the open parts 32, and being abutted against each other at the attachment parts 38.

Accordingly, the female connection device 22 is formed to create a slot 33, beginning at the open end 26, and extending substantially to the attachment parts 38. More particularly, the slot terminates at the transitional parts 39.

It should be clear that the female connection devices 22 are shown in a way which illustrates its consistent cross-section along its length. Accordingly, other than being fabricated from two plates 30 as illustrated, the female connection device 22 can be extruded and would thereby be formed of one piece of material. Depending on the application, that material can be various metals, or even plastic.

Referring to FIG. 2, a plurality of catch openings 40 are longitudinally spaced along each of the open parts 32 on each of the female connection devices 22, and are generally located at the same position on each of the complimentary open parts 32. The purpose of the catch openings 40 will be apparent immediately hereinafter.

Referring to both FIG. 1 and FIG. 2, the lance 24 is provided to facilitate connection of two female connection devices 22. In particular, the lance 24 is substantially flat, and has a first broad side 241 and a second broad side 242. The lance 24 has catches 245, longitudinally spaced at corresponding positions on both the first broad side 241 and second broad side 242. The longitudinal spacing of the catches 245 corresponds exactly to the spacing of the catch openings 40 on the open parts 32 of the female connection device 22. Accordingly then, the lance 24 is intended for insertion into the open end 26 of each female connection device 22 so that the catches 245 align with and engage the catch openings 40.

More particularly, the catches 245 are arranged in a pair of parallel rows 246 on each of the first broad side 241 and second broad side 242. Thus, to facilitate attachment of the two female connection devices 22, the lance 24 is inserted into the open end 26 of each of the female connection devices 22, and one of the rows 246 on each of the broad sides 241, 242 engages the catch openings 40 on one of the female connection devices 22, while the other rows 246 engage the catch openings 40 on the other of the female connection devices 22. Accordingly, the lance 24 connects the female connection devices.

The lance 24 is preferably made from a pair of laminated sheets 248 of metal, such that the first broad side 241 is located on one of the sheets 248 of metal, and the second broad side 242 is located on the other sheet 248 of metal. The sheets 248 are stamped, prior to their lamination, to create the catches 245, such that the catches 245 protrude from the broad sides 241, 242, and on each of said sides, the catches 245 of each of the rows 246 are inclined toward the catches of the other row 246. The catches 245 each have a free edge 247 which faces one of the catches 245 in the adjacent row 246. The rows on each broad side 241, 242 extend substantially parallel to each other.

Figure 4:
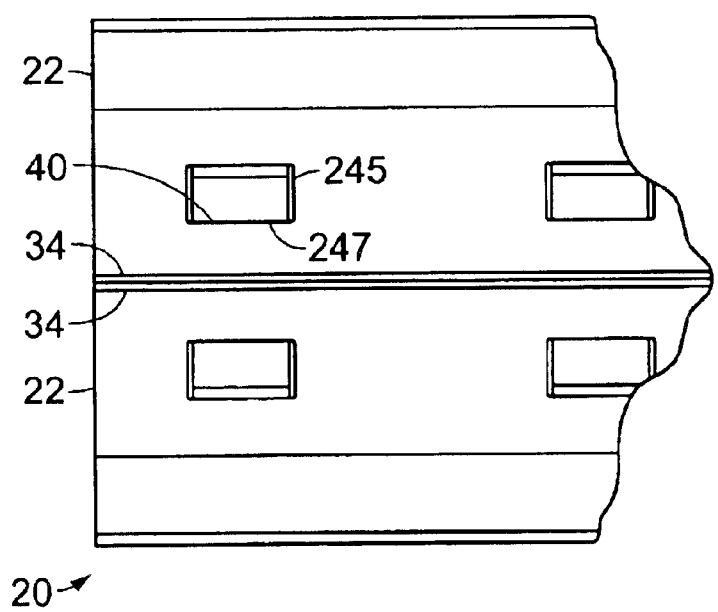
FIG. 4 is a front elevational view thereof, with a portion broken away which illustrates that the connection device is of arbitrary length.

The rows of catches 245 are of course spaced apart from each other so that they can each engage the catch openings 40 of one of the female connection devices 22, such that when female connection devices 22 are thus mated as in FIG. 3, the surface bends 34 of the two female connection devices 22 substantially abut each other. As seen in FIG. 4, the catches 245 are inclined such that the free edge 247 engages the catch openings 40 to prevent the female connection devices 22 from being pulled apart. Note that the extent of inclination of the catches 245 might be exaggerated slightly in the drawing figures for illustrative purposes when viewing the connector set 20 in side elevation. The catches 245 need not actually protrude beyond the broad sides 241, and 242, but simply get 'caught' on the edges of the catch openings 40—depending on the thickness of material employed for the open parts 32.

Figure 5:
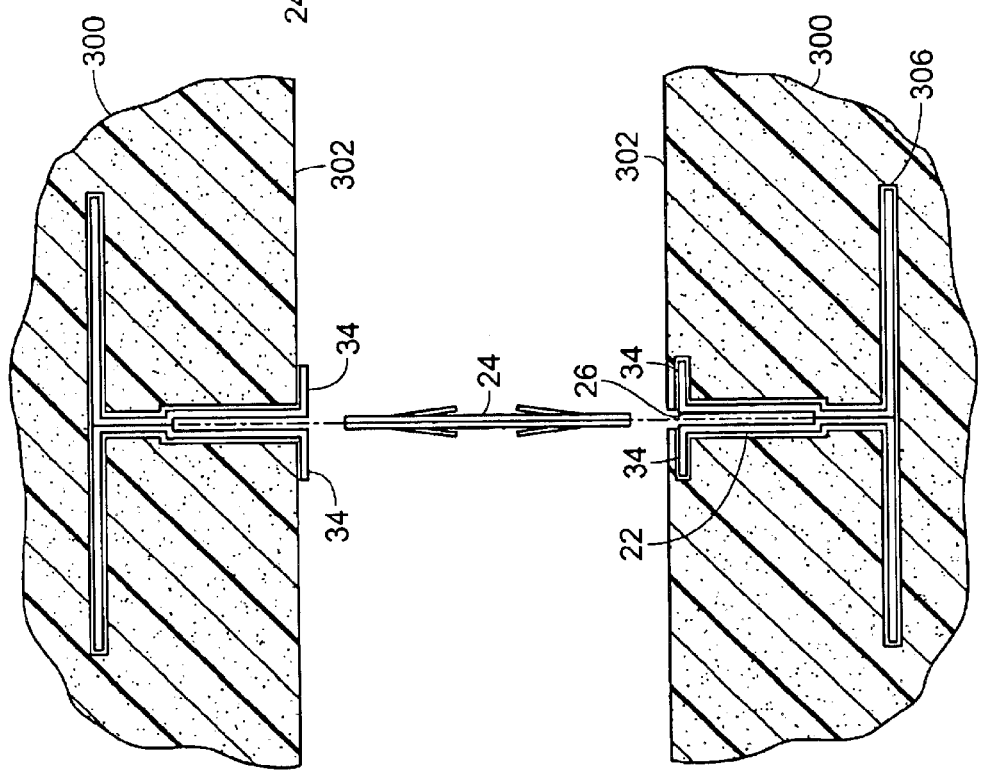
FIG. 5 is an exploded view, similar to FIG. 1, except wherein the female connection devices are each embedded within a block of foam and have an open end which is exposed at the surface of that block of foam.

In the embodiment described thus far, the connector set 20 includes two female connection devices 22 and a lance 24. FIG. 5 illustrates this connector set 20 being used to join two foam blocks 300, each foam block having a surface 302. Each of the female connection devices 22 is partially or fully submerged beneath the surface 302 of one of the foam blocks 300, and extends within a channel 304 extending through that block 300, parallel to and near its surface 302.

In general, the channel 304 is elongated, having a length to accommodate the female connection device 22 and has a uniform cross sectional shape which mimics the overall cross sectional profile of the female connection device. Accordingly, the female connection device 22 is easily slid longitudinally into the channel 304, where it fits snugly. The flange halves 36 of the female connection devices 22 extend laterally to anchor the female connection device within the block of foam and prevent the connection device 22 from 'pulling out' of the block 300.

FIG. 5 further illustrates how the surface bends 34 can be submerged beneath the surface 302 by shaping the channel 304 to accommodate the surface bends 34, or can have the surface bends 34 extending directly against the surface 302 of the block 300. Both of these configurations, illustrated in FIG. 5 function equally well. Submerging the surface bends 34 beneath the surface 302 of the block 300 serves an additional aesthetic function, in applications where it is not certain that any attachment will be made to the female connection device 22. Accordingly, the female connection will remain concealed within the block 300 until it is needed to allow another block to be attached thereto, the surface 302 of the block may itself be made continuous across the open end 26 of the female connection device 22. When desired to make a connection, the surface 302 may be opened to expose the open end 26 of the female connection device 22—even using the lance 241.

Figure 6:
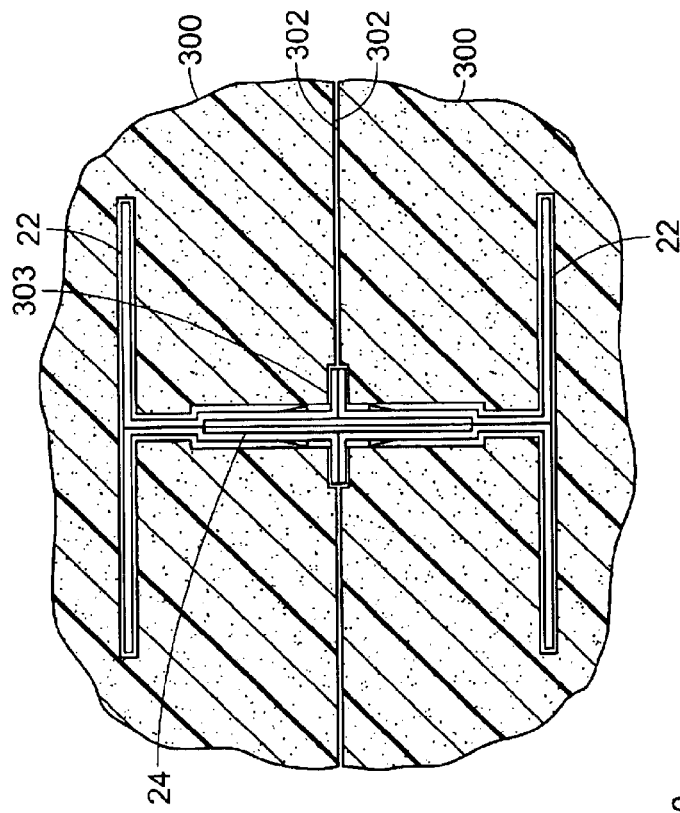
FIG. 6 is a side elevational view, illustrating the blocks of foam joined together by attaching the lance within each of the open ends of the female connection devices.

FIG. 6 illustrates two blocks 300 joined together, such that their surfaces 302 substantially abut each other. The lance 24 holds the female connection devices 22 together, which are themselves securely anchored within the blocks 300. Thus, the lance 24 holds the blocks 300 together.

In FIG. 6, the channels 306 have been configured so that the surfaces 302 of the blocks 300 each have surface recesses 303 which accommodate the surface bends 34 of the female connection devices 22, so that they are outwardly flush with the surface 302 of their associated block 300. This configuration allows the surfaces 302 to most closely abut each other once the blocks 300 are connected with the lance 24.

Figure 7:
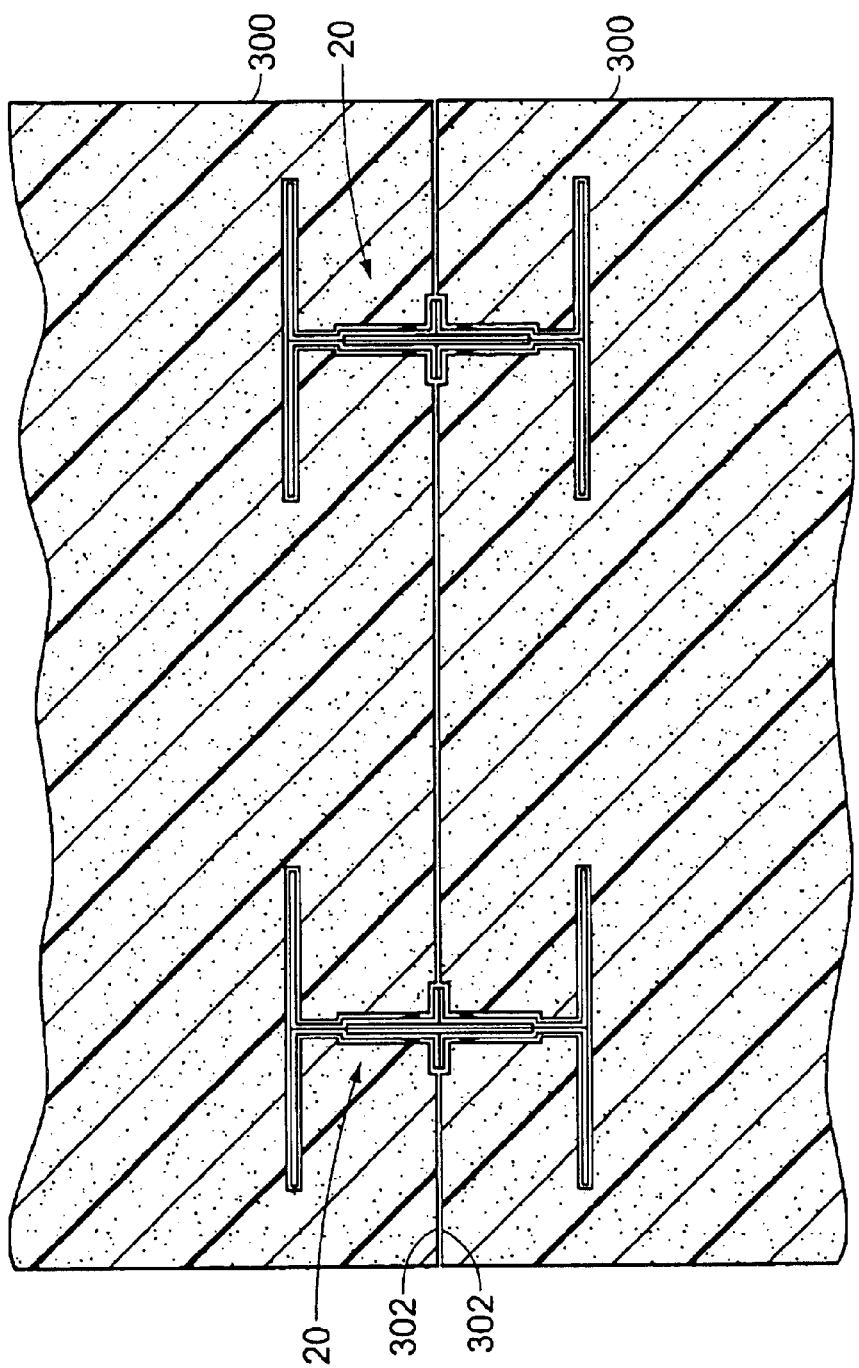
FIG. 7 is a side elevational view, illustrating a pair of blocks joined together using more than one connector set to more securely join the same pair of surfaces.

FIG. 7 illustrates a pair of connector sets 20 being used to join together two surfaces 302 of two blocks 300. Each of the connector sets 20 extends longitudinally through the blocks, and 'into the drawing sheet'. The connector sets 20 may be spaced and positioned as needed to provide the requisite structural strength for the joinder of the blocks 300—according to the application. It should be noted that although the drawing figures illustrate the blocks being 'broken away', FIGS. 5, 6, 7, 8, 9, 10, and 11 could easily also be end views. In general, the connector sets have consistent cross-sectional profiles. Further, anchoring the connectors within the blocks of foam 300 involves cutting a channel in the foam, which requires an open end in a plane perpendicular to the surface 302. Accordingly, these views also illustrate the system as it would be seen from the open end.

Figure 8:
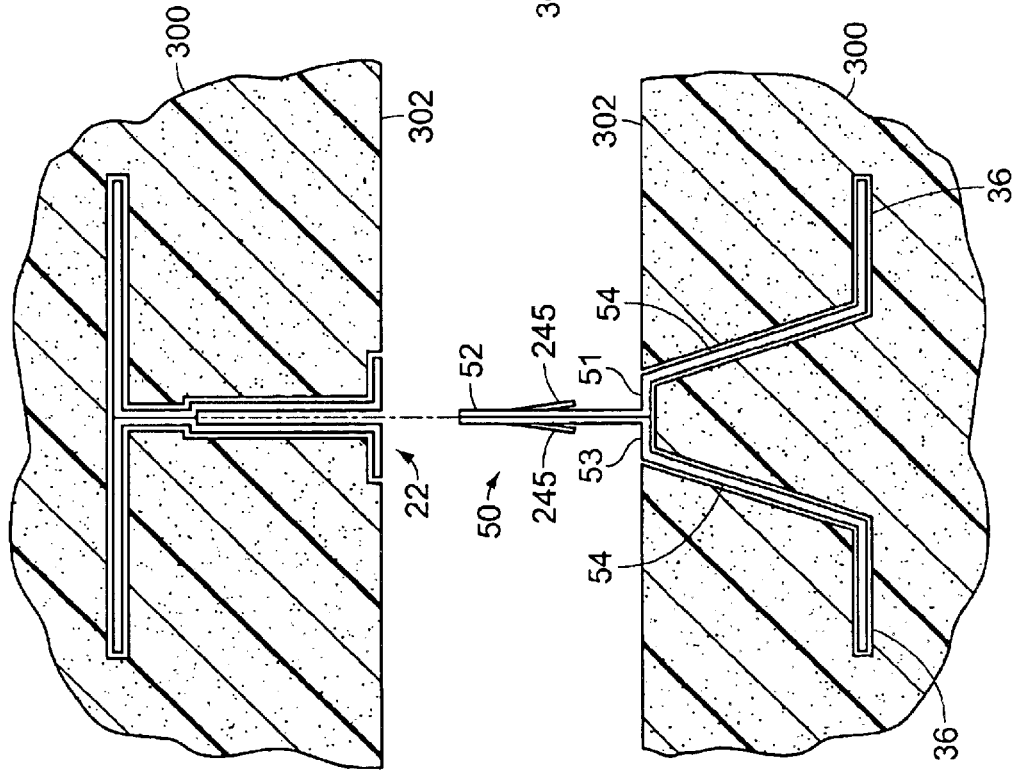
FIG. 8 is a side elevational view, illustrating an additional embodiment of the invention, wherein a male connection device is employed.

FIG. 8 illustrates an additional embodiment of the invention, wherein one of the female connection devices 22 is attached within one of the foam blocks 300, with its open end 26 exposed at the surface 302 of that foam block. A male connection device 50 is also in use, the male connection device 50 is partially submerged within another of the foam blocks 300. The male connection device 50 has a male projection 52 which extends above the surface 302 of its foam block 300 (outside of the foam block), and is similar in configuration to the lance 24, wherein the male projection 52 is configured for insertion into the open end 26 and has catches 245 which are longitudinally spaced in two rows on opposite sides of the male projection 52, for engaging the catch openings 40 in the female connection device 22.

In general, the male connection device 50 has an anchoring base 51 which is mostly submerged within the foam to secure the male connection device 50 within its foam block 300, and has the male projection 52 which facilitates attachment to the female connection device 22. The anchoring base 51 includes the flange, which is hereto comprised of the flange halves 36, an anchor top 53 two which the male projection 52 is attached, and diagonal portions 54 which connect the anchor top 53 and flange halves 36 while enhancing the surface area which contacts the foam block 300.

Figure 9:
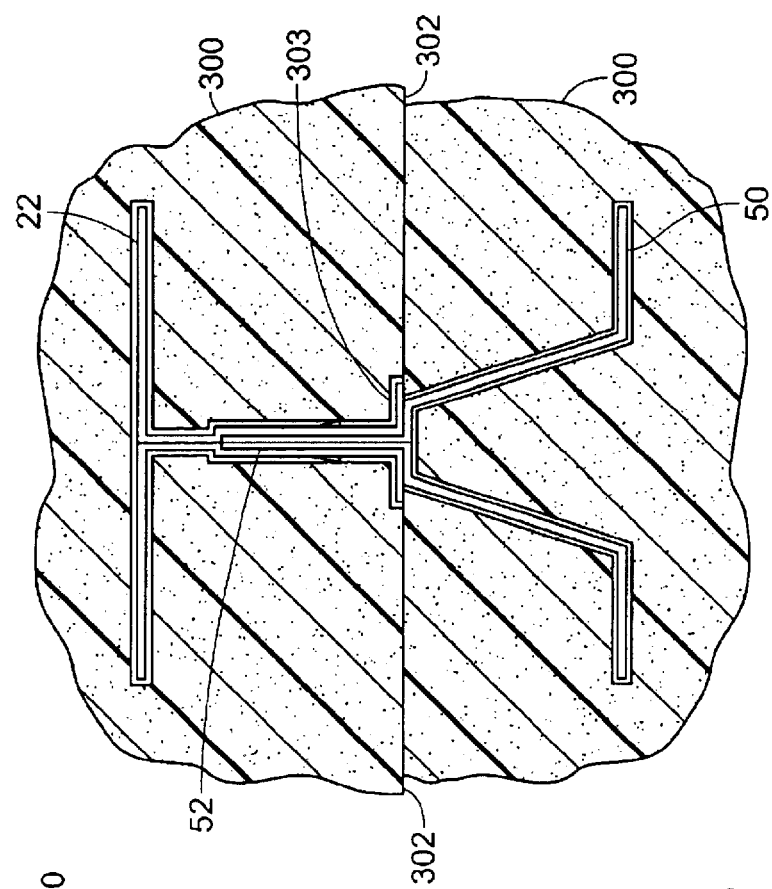
FIG. 9 is a side elevational view, illustrating the additional embodiment in use, wherein the male connection device is partially embedded within a foam block, and the male projection of the male connection device is locked within the open end of the female connection device to join the foam blocks.

FIG. 9 illustrates the connection of the foam blocks 300 by inserting the male projection 52 into the open end 26 of the female connection device 22, and engaging the catch openings 40 on the female connection device 22 with the catches 245 of the male projection 52 (as suggested by FIG. 8). Accordingly, the foam blocks 300 are held together. In this embodiment, the channels include surface recesses 303 to accommodate both the anchor top 53 of the male connection device 50 on one block 300 and the surface bends 34 of the female connection device 22, which truly allow the surfaces 302 to abut each other.

Figure 10:
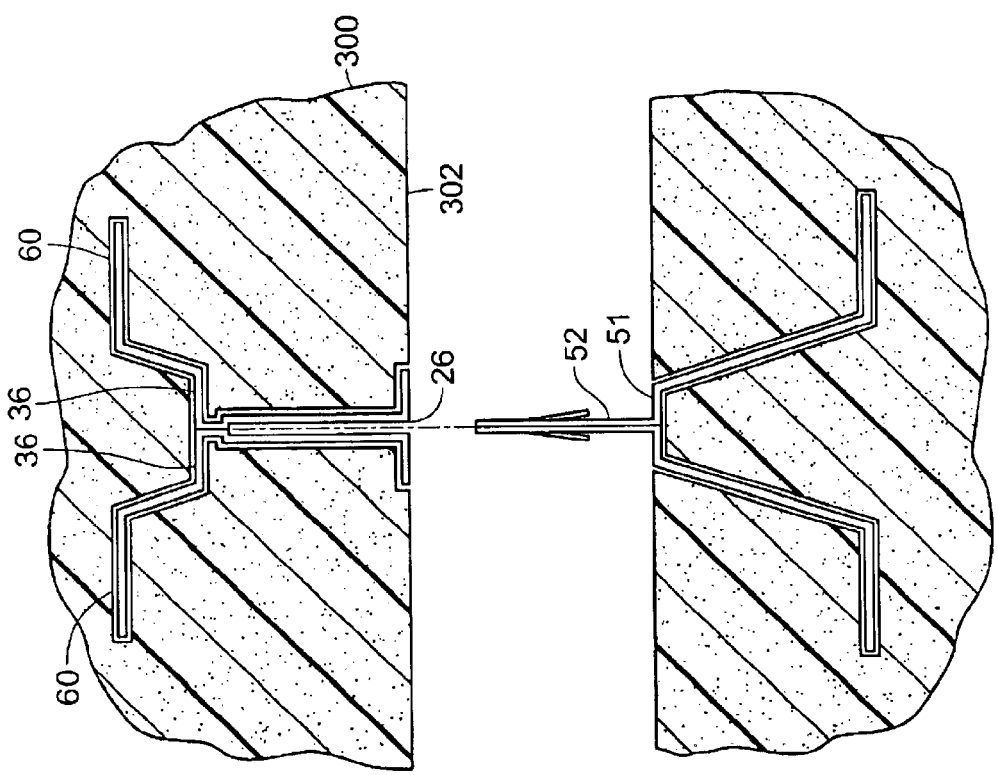
FIG. 10 is a side elevational view, illustrating a further embodiment of the invention, wherein the female connection device has a 'dutch hat' configuration for increased anchoring strength within its associated foam block.

FIG. 10 illustrates a further embodiment of the invention, wherein the female connection device 22 has a pair of supplementary anchors 60 attached to the flange halves 36, extending further away from the open end 26 and thus the surface 302 of the foam 300, and laterally outward from the flange halves. The supplementary anchors have a 'dutch hat' configuration' which increases the surface area that the female connection device 22 contacts within the foam module 300, and thereby provides enhanced integrity and superior anchoring within the foam module, which helps resist 'side loading', perpendicular to the axis of connection.

Figure 11:
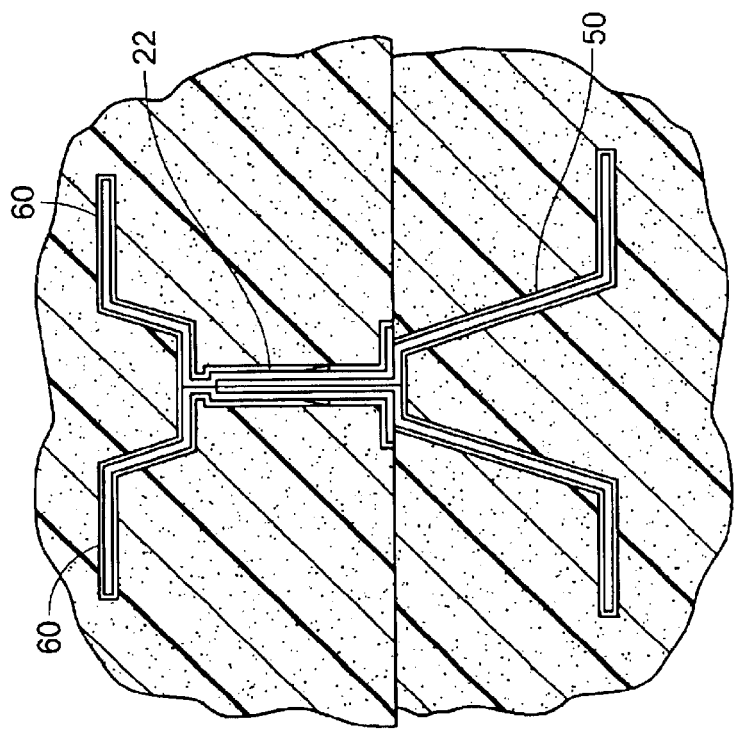
FIG. 11 is a side elevational view, illustrating the male connection device engaged with the further embodiment of the female connection device, providing a joint having significant tensile strength.

FIG. 11 illustrates the female connection device 22 having the supplementary anchors 60 fastened to the male connection device 50 to hold the foam blocks together 20. However, the female connection device 22 having the supplementary anchors 60 can also be used with the lance 24, to connect to another female connection device 22 with or without the supplementary anchors 60.

In conclusion, herein is presented a system for joining blocks of foam by using a pair of connectors which are each embedded, partially or fully, within a block of foam near surfaces thereof to be joined. The invention is illustrated by example in the attached drawings figures and in the foregoing description. Numerous variations are possible, however, while adhering to the inventive concept. Such varations are contemplated as being a part of the present invention.

What is claimed is:

1. A system for joining two blocks of foam, each of said blocks of foam having a surface which abuts the surface of the other block of foam once joined, said system comprising:
a connector set, having a first connector device that is a female connection device having an open end, a pair of open parts that are parallel to each other near the open end, the open parts each having catch openings spaced longitudinally therealong, and including a laterally extending flange for anchoring within one of the blocks of foam, the first connector device for extending longitudinally within said block of foam with said open end near and substantially parallel to said surface; the connector set having a second connector device which has a lateral flange for anchoring within the other of the blocks of foam, the second connector device for extending longitudinally said block of foam near said surface; and the connector set having a mechanism for securing the first connector device to the second connector device having catches which are inclined such that when the mechanism is inserted into the open end of the female connection device, the catches engage the catch openings and prevent the female connection device and the second connection device from being pulled apart, such that the surfaces of the blocks of foam substantially abut each other and the connector set prevents the surfaces from being pulled apart.

2. The system for joining the two blocks of foam as recited in claim 1, wherein the second connector device is another female connection device, and wherein the mechanism for securing the first connector device to the second connector device is a lance, the lance having at least two parallel rows of catches, such that the lance may be selectively inserted into the open ends of both of the female connector devices wherein one of the rows of catches engages one of the female connector devices and the other row of catches engages the other of the female connector devices such that the lance effectively joins the female connector devices and thereby joins the blocks of foam within which they extend.

3. The system for joining the two blocks of foam as recited in claim 1, wherein each of the open parts of the female connection device have a transitional part which connects said two open parts and limits travel of the lance into the open end, the transitional part is connected to the flange, and wherein the lance is sized so that it extends into a pair of female connection parts it reaches the transitional parts of both and engages the catch openings of both with its rows of catches.

4. The system for joining the two blocks of foam as recited in claim 3, wherein the catches each have a free end, are inclined toward the free end, and the free ends of catches in each of the parallel rows face each other.

5. The system for joining the two blocks of foam as recited in claim 4, wherein the lance comprises a first broad surface and a second broad surface; wherein each of said broad surfaces have pairs of parallel rows of catches in corresponding positions; and wherein the open parts of the female connection device have catch openings which are directly opposite from each other.

6. The system for joining the two blocks of foam as recited in claim 1, wherein the second connector is a male connection device which includes an anchoring portion having the flange and a male projection rigidly attached to the anchoring portion, wherein the mechanism for attaching the first connector to the second connector includes the male projection, and wherein the male projection has the catches.

7. The system for joining the two blocks of foam as recited in claim 6, wherein the female connection device has surface bends at the open end fully opposite from the flange of the female connection device, and wherein the male projection is sized to fit within the open end of the female connection so that the anchoring portion closely abuts surface bends when the catches engage the catch openings.

8. The system for joining the two blocks of foam as recited in claim 7, wherein the female connection device further has a supplementary anchor attached to the flange which extends away from the open end and laterally outward therefrom for allowing the female connection device to be more securely anchored within its associated block of foam.

9. A method for joining two blocks of foam, each of said blocks of foam having a surface which is adjacent to said surface on the other block of foam, using a connector set including a first connector and a second connector, the first connector is a female connection device having an open end, having a pair of facing open parts which each have at least one catch opening, and having a laterally extending flange, and the second connector is a male connector having an anchoring portion having a laterally extending flange and having a male projection attached to the anchoring portion, the first connector and second connector, comprising the steps of:

anchoring the first connector within one of the blocks of foam, the first connector extending longitudinally near and parallel to the surface of one of said blocks of foam, the first connector flange extending substantially parallel to the surface of said block of foam;

anchoring the second connector within the other of the blocks of foam, the second connector extending longitudinally near and parallel to the surface of said block of foam, the first connector flange extending substantially parallel to the surface of said block of foam by extending the anchoring portion substantially beneath the surface, within the foam, and extending the male portion substantially above the surface, outside of the foam; and securing the two blocks of foam together while substantially abutting their surfaces by securing the first connector to the second connector.

10. The method for joining the two blocks of foam as recited in claim 9, wherein the first and second connectors are female connection devices, each having an open end, having a pair of parallel open parts which have catch openings spaced longitudinally therealong, using a lance having at least two rows of catches, wherein the steps of securing the two blocks of foam together further comprises:

engaging the catch openings of the first connector with catches from one of the rows of catches on the lance by inserting the lance into the open end of the first connector; and engaging the catch openings of the second connector with catches from another of the rows of catches on the lance by inserting the lance into the open end of the second connector.

11. The method for joining the two blocks of foam as recited in claim 10, wherein the steps as recited are preceded by the steps of cutting a channel in the blocks of foam to accommodate the cross sectional shape of the connector associated with said block of foam, and wherein the steps of anchoring the connectors within said associate block of foam further comprises sliding the connector longitudinally into said associated block of foam.

12. The method for joining the two blocks of foam as recited in claim 11, wherein each of the female connection parts have a transitional part which joins the open parts, and wherein the steps of inserting the lance into the open end of each of the first and second connectors further comprises inserting the lance fully to the transitional parts.

13. The method for joining the two blocks of foam as recited in claim 9, wherein the step of securing the two blocks of foam together further comprises:

engaging the catch openings of the first connector with catches from the male projection by inserting the male projection into the open end of the first connector.

14. The method for joining the two blocks of foam as recited in claim 13, wherein the facing open parts are parallel plates, each having a plurality of longitudinally spaced catch openings, and wherein the male projection has at least two rows of longitudinally spaced catches.

* * * * *